(12) United States Patent
Ueda et al.

(10) Patent No.: US 10,680,272 B2
(45) Date of Patent: Jun. 9, 2020

(54) POWER STORAGE DEVICE

(71) Applicant: Murata Manufacturing Co., Ltd., Nagaokakyo-shi, Kyoto-fu (JP)

(72) Inventors: Yasuhiko Ueda, Nagaokakyo (JP); Yasutake Fukuda, Nagaokakyo (JP); Norihisa Aoki, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 24 days.

(21) Appl. No.: 16/234,854

(22) Filed: Dec. 28, 2018

(65) Prior Publication Data

US 2019/0140304 A1    May 9, 2019

Related U.S. Application Data

(63) Continuation of application No. PCT/JP2017/029655, filed on Aug. 18, 2017.

(30) Foreign Application Priority Data

Sep. 26, 2016   (JP) ................... 2016-186625

(51) Int. Cl.
| | | |
|---|---|---|
| *H01M 10/04* | (2006.01) | |
| *H01M 2/12* | (2006.01) | |
| *H01G 11/26* | (2013.01) | |
| *H01G 11/52* | (2013.01) | |
| *H01G 11/74* | (2013.01) | |
| *H01G 11/56* | (2013.01) | |
| *H01G 11/34* | (2013.01) | |
| *H01G 11/78* | (2013.01) | |

(52) U.S. Cl.
CPC ............ *H01M 10/04* (2013.01); *H01G 11/26* (2013.01); *H01G 11/34* (2013.01); *H01G 11/52* (2013.01); *H01G 11/56* (2013.01); *H01G 11/74* (2013.01); *H01G 11/78* (2013.01); *H01M 2/12* (2013.01)

(58) Field of Classification Search
CPC combination set(s) only.
See application file for complete search history.

(56) References Cited

U.S. PATENT DOCUMENTS

| | | | |
|---|---|---|---|
| 9,691,550 B2 | 6/2017 | Schossmann et al. | |
| 9,911,547 B2 | 3/2018 | Horikawa | |
| 2004/0072072 A1* | 4/2004 | Suzuki ............... | C01G 45/1221 429/231.1 |
| 2014/0362496 A1 | 12/2014 | Horikawa | |
| 2015/0294792 A1 | 10/2015 | Schossmann et al. | |

FOREIGN PATENT DOCUMENTS

| | | |
|---|---|---|
| JP | H07240337 A | 9/1995 |
| JP | 2012033907 A | 2/2012 |
| JP | 2015535145 A | 12/2015 |
| WO | 2013002119 A1 | 1/2013 |
| WO | 2013099541 A1 | 7/2013 |

OTHER PUBLICATIONS

International Search Report issued in PCT/JP2017/029655, dated Oct. 31, 2017.
Written Opinion of the International Searching Authority issued in PCT/JP2017/029655, dated Oct. 31, 2017.

* cited by examiner

*Primary Examiner* — Kaity V Chandler
(74) *Attorney, Agent, or Firm* — Arent Fox LLP

(57) ABSTRACT

A power storage device having a laminated body and a portion of lower mechanical strength than the laminated body.

8 Claims, 3 Drawing Sheets

POWER STORAGE DEVICE

CROSS REFERENCE TO RELATED APPLICATIONS

The present application is a continuation of International application No. PCT/JP2017/029655, filed Aug. 18, 2017, which claims priority to Japanese Patent Application No. 2016-186625, filed Sep. 26, 2016, the entire contents of each of which are incorporated herein by reference.

FIELD OF THE INVENTION

The present invention relates to a power storage device.

BACKGROUND OF THE INVENTION

Conventionally, there are various known power storage devices such as electric double layer capacitors and secondary batteries. For example, Patent Document 1 discloses one example of a power storage devices. The power storage device in Patent Document 1 includes a laminated body of a cathode, a separator and an anode, electrolytes, and a package which houses the laminated body and the electrolytes.

Patent Document 1: Japanese Patent Application Laid-Open No. 2012-33907

SUMMARY OF THE INVENTION

There is a demand to improve reliability of power storage devices, and a main object of the present invention is to improve the reliability of such power storage devices.

A power storage device according to one aspect of the present invention includes a device main body, a first electrode film, and a second electrode film. The device main body includes a function unit. The function unit includes a laminated body of a first internal electrode, a second internal electrode and a separator. The first internal electrode extends along a length direction and a width direction. The second internal electrode is laminated in a thickness direction on the first internal electrode. The separator is disposed between the first internal electrode and the second internal electrode. The function unit includes first and second principal surfaces, first and second side surfaces and first and second end surfaces. The first and second principal surfaces extend along the length direction and the width direction. The first and second side surfaces extend along the length direction and the thickness direction. The first and second end surfaces extend along the width direction and the thickness direction. A first electrode film is provided on the device main body. The first electrode film is connected to the first internal electrode. A second electrode film is provided on the device main body. The second electrode film is connected to the second internal electrode. A portion of lower mechanical strength than the laminated body is formed in the function unit. Hence, when a gas is produced in the function unit during reflow or use and an internal pressure of the function unit rises, the portion of the lower mechanical strength of the function unit is preferentially damaged. Hence, a laminated body portion of the function unit which is provided with the first and second internal electrodes and exhibits the function of the power storage device is hardly damaged. Consequently, the power storage device according to the present invention has good reliability.

In the power storage device according to an aspect of the present invention, the portion of the lower mechanical strength than the laminated body is preferably formed in at least one of outermost layers on both sides in the thickness direction of the function unit.

In addition, according to the present invention, low mechanical strength means a low elastic modulus, and high mechanical strength means a high elastic modulus. The elastic modulus can be measured by, for example, a scanning probe microscope.

In the power storage device according to an aspect of the present invention, a hollow portion may be formed as the portion of the lower mechanical strength.

In the power storage device according to another aspect of the present invention, the portion of the lower mechanical strength may be a plurality of laminated layers which delaminate more readily than the laminated body.

In the power storage device according to another aspect of the present invention, the first electrode film covers the first end surface of the function unit, and the second electrode film covers the second end surface of the function unit.

According to the various features of the present invention described herein, it is possible to improve electrical reliability of power storage devices.

DETAILED DESCRIPTION OF THE INVENTION

Figure 1:
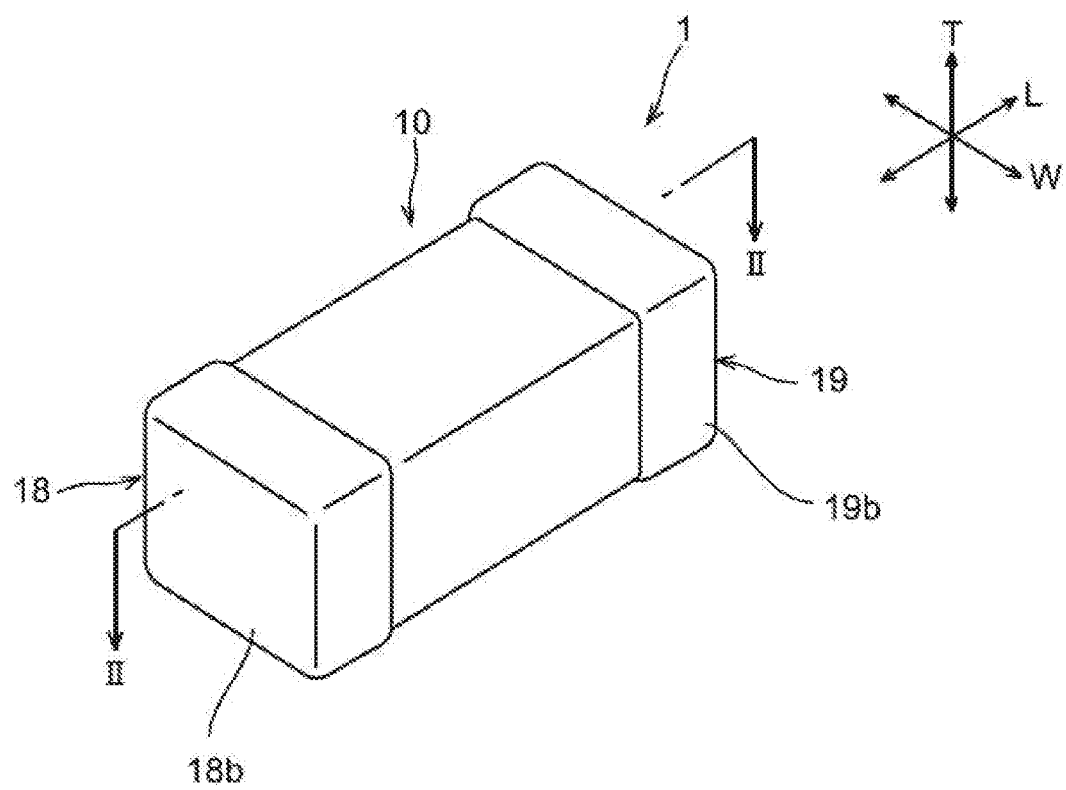
FIG. 1 is a schematic perspective view of a power storage device according to one embodiment of the present invention.

Hereinafter, an example of a preferred mode for carrying out the present invention will be described. In this regard, the following embodiment is a merely exemplary embodiment. The present invention is by no means limited to the following embodiment.

Furthermore, members having substantially the same functions will be referred to the same reference numerals in each drawing referred to in the embodiment. Furthermore, the drawings referred to in the embodiment provide schematic illustrations. Ratios of dimensions of objects drawn in the drawings are different from actual ratios of dimensions of objects. The ratios of the dimensions of the objects are different between the drawings in some cases. Specific ratios of the dimensions of the objects need to be decided taking the following description into account.

Figure 2:
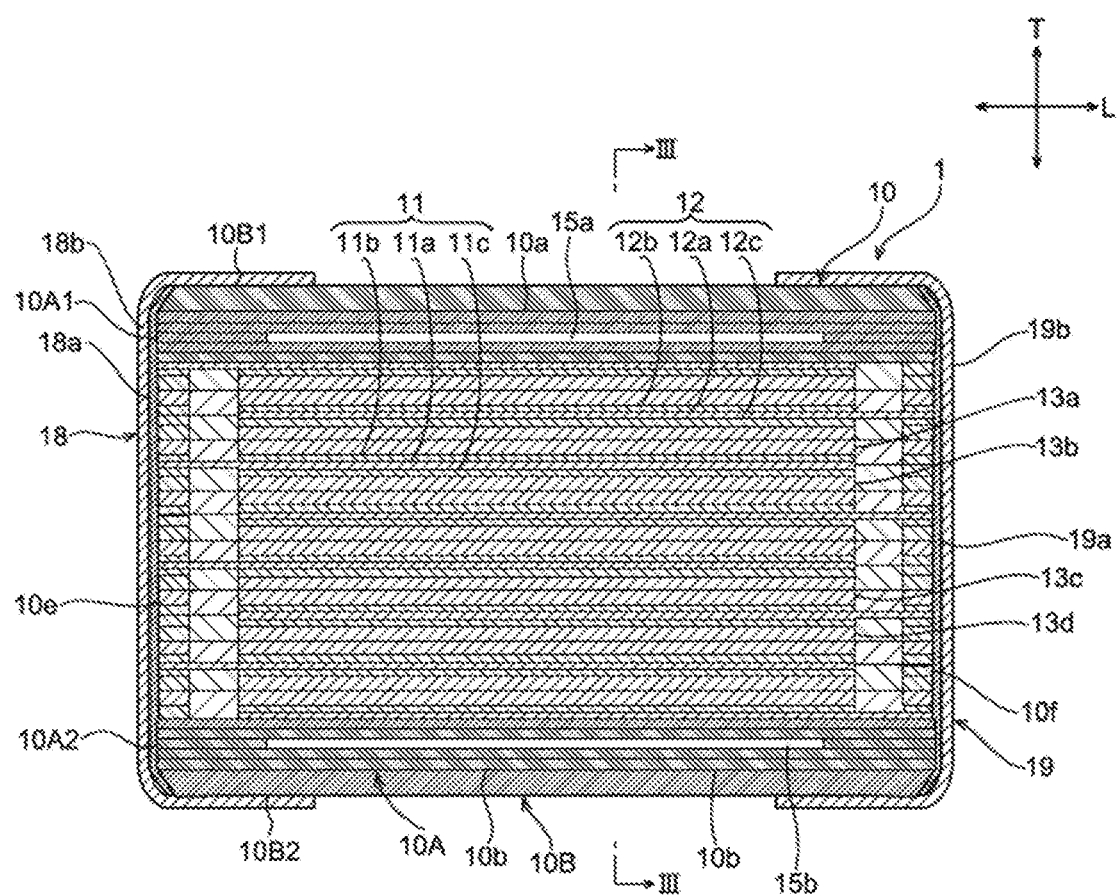
FIG. 2 is a schematic cross-sectional view taken along line II-II in FIG. 1.
Figure 3:
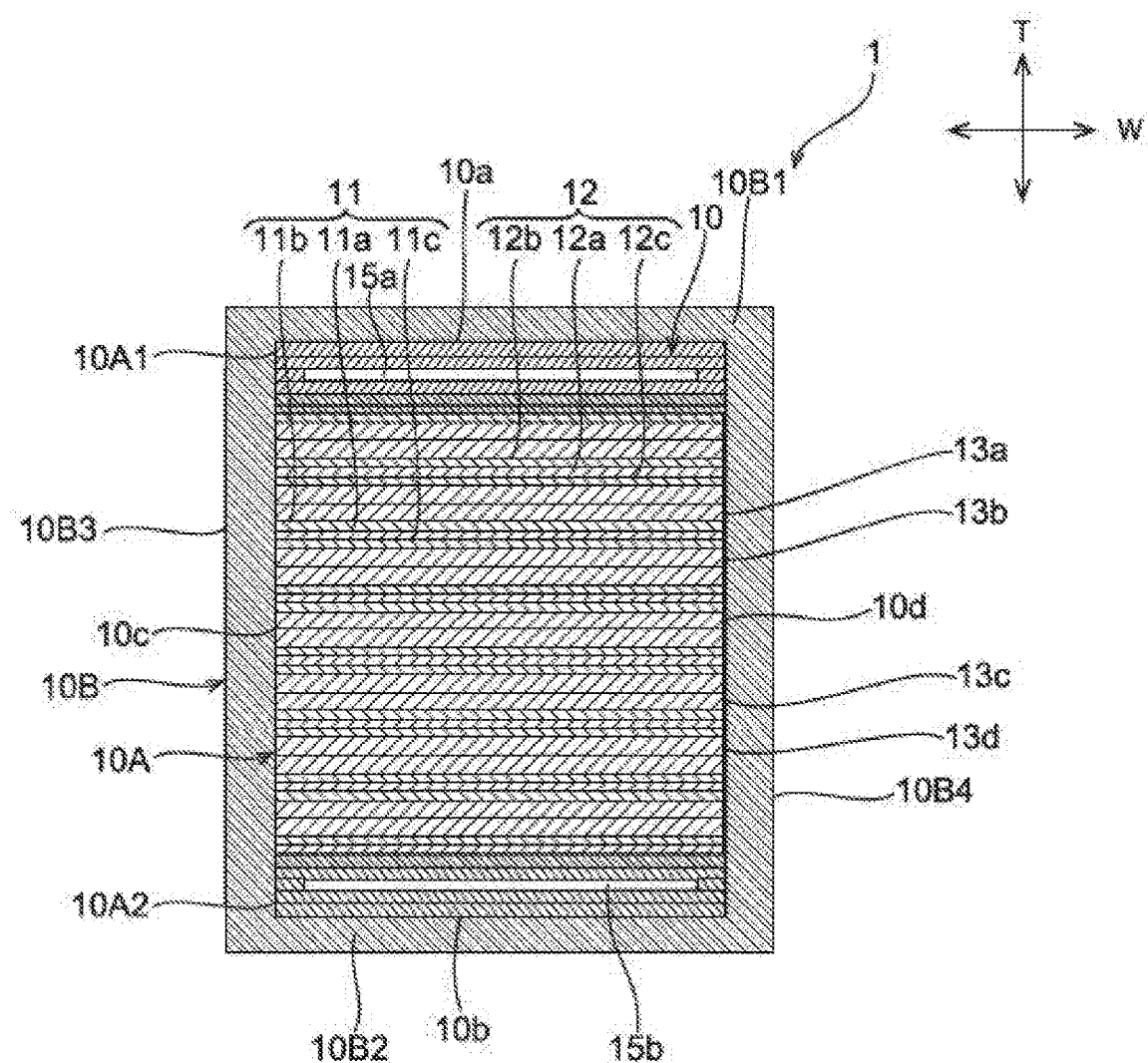
FIG. 3 is a schematic cross-sectional view taken along line III-III in FIG. 2.

FIG. 1 is a schematic perspective view of a power storage device according to the present embodiment. FIG. 2 is a schematic cross-sectional view taken along line II-II in FIG. 1. FIG. 3 is a schematic cross-sectional view taken along line III-III in FIG. 2.

A power storage device 1 illustrated in FIGS. 1 to 3 is, for example, a device which constitutes an electric double layer capacitor or a secondary battery.

The power storage device 1 includes a device main body 10. As illustrated in FIGS. 2 and 3, the device main body 10 includes a function unit 10A and an exterior body 10B.

The function unit 10A is a portion at least part of which functions as the power storage device. The function unit 10A is formed in a substantially rectangular parallelepiped shape. The function unit 10A includes first and second principal surfaces 10a and 10b, first and second side surfaces 10c and 10d (see FIG. 3), and first and second end surfaces 10e and 10f (see FIG. 2). The first and second principal surfaces 10a and 10b extend along a length direction L and a width direction W. The first principal surface 10a and the second principal surface 10b face each other in a thickness direction T. As illustrated in FIG. 3, the first and second side surfaces 10c and 10d extend along the length direction L and the thickness direction T. The first side surface 10c and the second side surface 10d face each other in the width direction W. As illustrated in FIG. 2, the first and second end surfaces 10e and 10f extend along the width direction W and the thickness direction T. The first end surface 10e and the second end surface 10f face each other in the length direction L.

The function unit 10A includes a plurality of first internal electrodes 11, a plurality of second internal electrodes 12, electrolyte containing layers 13a, 13b, 13c and 13d, a first outermost layer 10A1 and a second outermost layer 10A2.

The first internal electrode 11 extends along the length direction L and the width direction W. The first internal electrodes 11 are provided in parallel to the first and second principal surfaces 10a and 10b. The first internal electrodes 11 are extended to the first end surface 10e and the first and second side surfaces 10c and 10d, yet are not extended to the second end surface 10f.

The first internal electrode 11 includes a first current collector 11a, and first active material layers 11b and 11c The first current collector 11a can be formed by a metal foil made of at least one type of a metal such as aluminum or copper.

The first active material layer 11b is provided on a surface on one side of the first current collector 11a, and the first active material layer 11c is provided on a surface on the other side. The first active material layers 11b and 11c are members which constitute polarizable electrodes when the power storage device 1 constitutes an electric double layer capacitor. In this case, the first active material layers 11b and 11c preferably include a carbon material such as activated carbon.

The second internal electrode 12 extends along the length direction L and the width direction W. The second internal electrode 12 is laminated in the thickness direction T on the first internal electrode 11. The second internal electrode 12 faces the first internal electrode 11 in the thickness direction T. The first and second internal electrodes 11 and 12 are alternately provided along the thickness direction T.

The second internal electrodes 12 are provided in parallel to the first and second principal surfaces 10a and 10b. The second internal electrodes 12 are extended to the second end surface 10f and the first and second side surfaces 10c and 10d, yet are not extended to the first end surface 10e.

The second internal electrode 12 includes a second current collector 12a, and second active material layers 12b and 12c The second current collector 12a can be formed by a metal foil made of at least one type of a metal such as aluminum or copper.

The second active material layer 12b is provided on a surface on one side of the second current collector 12a, and the second active material layer 12c is provided on a surface on the other side. The second active material layers 12b and 12c are members which constitute polarizable electrodes when the power storage device 1 constitutes an electric double layer capacitor. In this case, the second active material layers 12b and 12c preferably include a carbon material such as activated carbon.

The second active material layer 12c faces the first active material layer 11b. The second active material layer 12b faces the first active material layer 11c.

The first electrolyte containing layer 13a is provided on the first active material layer 11b. The first electrolyte containing layer 13b is provided on the first active material layer 11c. The second electrolyte containing layer 13c is provided on the second active material layer 12b. The second electrolyte containing layer 13d is provided on the second active material layer 12c. The electrolyte containing layers 13a, 13b, 13c and 13d disposed between these first internal electrodes 11 and second internal electrodes 12 constitute a separator. The electrolyte containing layers 13a, 13b, 13c and 13d insulate the first internal electrodes 11 and the second internal electrodes 12.

The electrolyte containing layers 13a, 13b, 13c and 13d each contain an electrolyte. The electrolyte containing layers 13a, 13b, 13c and 13d are preferably made of a gel containing the electrolyte. For example, a polymer polyethylene oxide resin can be used for the gel.

For example, an ion liquid such as EMITFSI (1-ethyl-3-methylimidazolium bis(trifluoromethanesulfonyl)imide) or EMIBF4 (1-ethyl-3-methylimidazolium tetrafluoroborate) or a liquid obtained by dissolving this ionic liquid in an organic solvent such as propylene carbonate or acetonitrile can be used for the electrolyte.

The first active material layer 11b and the second active material layer 12c face each other with the first electrolyte containing layer 13a and the second electrolyte containing layer 13d interposed therebetween. The first active material layer 11c and the second active material layer 12b face each other with the first electrolyte containing layer 13b and the second electrolyte containing layer 13c interposed therebetween.

The first outermost layer 10A1 is provided on an outermost layer of the function unit 10A on a side of the first principal surface 10a. The first outermost layer 10A1 is adhered by an adhesion layer. The first outermost layer 10A1 is not limited in particular as long as the first outermost layer 10A1 is an insulation member. The first outermost layer 10A1 may be made of the same material as that of the electrolyte containing layers 13a, 13b, 13c and 13d. Hence, the first outermost layer 10A1 may be impregnated with the electrolyte.

The second outermost layer 10A2 is provided on an outermost layer of the function unit 10A on a side of the second principal surface 10b. The second outermost layer 10A2 is adhered by an adhesion layer. The second outermost layer 10A2 is not limited in particular as long as the second outermost layer 10A2 is an insulation member. The second outermost layer 10A2 may be made of the same material as that of the electrolyte containing layers 13a, 13b, 13c and 13d. Hence, the second outermost layer 10A2 may be impregnated with the electrolyte.

The exterior body 10B covers part of an outer surface of the function unit 10A. More specifically, the exterior body 10B covers the first and second principal surfaces 10a and 10b and the first and second side surfaces 10c and 10d of the function unit 10A. The exterior body 10B does not cover the first and second end surfaces 10e and 10f. Hence, the first and second end surfaces 10e and 10f of the function unit 10A are exposed from the exterior body 10B.

The exterior body 10B includes a first portion 10B1, a second portion 10B2, a third portion 10B3 and a fourth portion 10B4. The first portion 10B1 covers the first principal surface 10a. The second portion 10B2 covers the second principal surface 10b. As illustrated in FIG. 3, the third portion 10B3 covers the first side surface 10c. The fourth portion 10B4 covers the second side surface 10d.

A first external electrode 18 is provided on the first end surface 10e. This first external electrode 18 covers an exposed portion of the function unit 10A exposed from the exterior body 10B. The first external electrode 18 is electrically connected to the first internal electrode 11 on the first end surface 10e.

The first external electrode 18 includes a first electrode film 18a and a first metal cap 18b.

The first electrode film 18a is connected to the first internal electrode 11 and covers the first end surface 10e. More specifically, the first electrode film 18a covers the substantially entire first end surface 10e. The first electrode film 18a is not located on the first and second principal surfaces 10a and 10b and the first and second side surfaces 10c and 10d.

The first metal cap 18b covers a portion of the device main body 10 on a side of the first end surface 10e. More specifically, the first metal cap 18b covers the first end surface 10e, and portions of the first and second principal surfaces 10a and 10b and the first and second side surfaces 10c and 10d on the side of the first end surface 10e.

The first metal cap 18b is electrically connected to the first electrode film 18a.

A second external electrode 19 is provided on the second end surface 10f and covers an exposed portion of the function unit 10A exposed from the exterior body 10B. The second external electrode 19 is electrically connected to the second internal electrode 12. The second external electrode 19 includes a second electrode film 19a and a second metal cap 19b.

The second electrode film 19a is connected to the second internal electrode 12. The second electrode film 19a is provided to cover the second end surface 10f. More specifically, the second electrode film 19a is provided to cover the substantially entire second end surface 10f. The second electrode film 19a is not located on the first and second principal surfaces 10a and 10b and the first and second side surfaces 10c and 10d.

The second metal cap 19b covers a portion of the device main body 10 on a side of the second end surface 10f. More specifically, the second metal cap 19b covers the second end surface 10f, and portions of the first and second principal surfaces 10a and 10b and the first and second side surfaces 10c and 10d on the side of the second end surface 10f.

The second metal cap 19b is electrically connected to the second electrode film 19a.

In the present embodiment, the first and second electrode films 18a and 19a are each formed by a thermal spray film. The first and second electrode films 18a and 19a can be made of at least one type of a metal selected from a group consisting of Al, Cu and Al—Si.

The first and second metal caps 18b and 19b can be made of, for example, a base material containing an alloy (Fe-42Ni alloy), a base material made of aluminum or an aluminum alloy, or a base material made of copper or a copper alloy, and nickel plating and silver plating or nickel plating and gold plating which cover an outer surface of the base material.

In a power storage device provided with the exterior body, a rise in a temperature during reflow or use produces a gas, and raises an internal pressure of the function unit. The rise in the internal pressure of the function unit is concerned to cause delamination of the function unit, and damage the function unit.

However, in the power storage device 1 according to the present embodiment, a fragile portion of lower mechanical strength than portions of the function unit 10A is formed in at least one of the first outermost layer portion 10A1 and the second outermost layer portion 10A2 of the function unit 10A.

More specifically, a hollow portion 15a is formed in the first outermost layer portion 10A1, and a hollow portion 15b is formed in the second outermost layer portion 10A2. According to this configuration, the portions of the first and second outermost layer portions 10A1 and 10A2 in which the hollow portions 15a and 15b are formed have low mechanical strength compared to other portions of the function unit 10A. Hence, the rise in the internal pressure of the function unit 10A preferentially damages the first and second outermost layer portions 10A1 and 10A2 of this function unit 10A which are not provided with the first and second internal electrodes 11 and 12, do not exhibit the function of the power storage device and have the lower mechanical strength. Hence, the portions of the function unit 10A which are provided with the first and second internal electrodes 11 and 12 are hardly damaged. Hence, the power storage device 1 has good reliability.

Particularly when the portion of the function unit 10A exposed from the exterior body 10B is covered by the first and second external electrodes 18 and 19, the internal pressure of the function unit 10A readily rises. Consequently, it is possible to provide a more remarkable effect of improvement of reliability of the power storage device 1 obtained by forming fragile portions having lower mechanical strength than other portions of the function unit 10A.

In addition, when the first outermost layer portion 10A1 and the second outermost layer portion 10A2 are made of the material impregnated with the electrolytes, the electrolyte may exist in the hollow portions 15a and 15b.

According to the present embodiment, the portions having low mechanical strength are formed in the hollow portions 15a and 15b. However, the present invention is not limited to this configuration. For example, the first outermost layer portion 10A1 and the second outermost layer portion 10A2 may be formed by a laminated body of a plurality of layers, and a portion at which delamination more readily occurs than the portions other than the first outermost layer portion 10A1 and the second outermost layer portion 10A2 may be formed in at least one of the first outermost layer portion 10A1 and the second outermost layer portion 10A2 as the portion of low mechanical strength.

The present embodiment has described the example where the portions of relatively weak mechanical strength are formed in both of the first outermost layer portion 10A1 and the second outermost layer portion 10A2. However, the present invention is not limited to this configuration. For example, the portion of the relatively weak mechanical strength may be formed only in one of the first outermost layer portion 10A1 and the second outermost layer portion 10A2.

In addition, the above embodiment has described an example where the portions of the lower mechanical strength than the laminated body are formed in respective outermost layers on both sides in the thickness direction of the function unit. However, the present invention is not limited to this configuration. According to the present invention, positions at which the portions of the lower mechanical strength than the laminated body are formed are not limited and can be, for example, formed inside the laminated body itself.

DESCRIPTION OF REFERENCE SYMBOLS

1: POWER STORAGE DEVICE
10: DEVICE MAIN BODY
10A: FUNCTION UNIT
10A1: FIRST OUTERMOST LAYER
10A2: SECOND OUTERMOST LAYER
10B: EXTERIOR BODY
10B1: FIRST PORTION
10B2: SECOND PORTION
10B3: THIRD PORTION
10B4: FOURTH PORTION
10$a$: FIRST PRINCIPAL SURFACE
10$b$: SECOND PRINCIPAL SURFACE
10$c$: FIRST SIDE SURFACE
10$d$: SECOND SIDE SURFACE
10$e$: FIRST END SURFACE
10$f$: SECOND END SURFACE
11: FIRST INTERNAL ELECTRODE
11$a$: FIRST CURRENT COLLECTOR
11$b$: FIRST ACTIVE MATERIAL LAYER
11$c$: FIRST ACTIVE MATERIAL LAYER
12: SECOND INTERNAL ELECTRODE
12$a$: SECOND CURRENT COLLECTOR
12$b$: SECOND ACTIVE MATERIAL LAYER
12$c$: SECOND ACTIVE MATERIAL LAYER
13$a$, 13$b$: FIRST ELECTROLYTE CONTAINING LAYER
13$c$, 13$d$: SECOND ELECTROLYTE CONTAINING LAYER
15$a$: HOLLOW PORTION
15$b$: HOLLOW PORTION
16$a$, 16$b$: ADHESION LAYER
18: FIRST EXTERNAL ELECTRODE
18$a$: FIRST ELECTRODE FILM
18$b$: FIRST METAL CAP
19: SECOND EXTERNAL ELECTRODE
19$a$: SECOND ELECTRODE FILM
19$b$: SECOND METAL CAP

The invention claimed is:

1. A power storage device comprising:
a device main body which comprises:
a function unit that includes a laminated body having a first internal electrode extending along a length direction and a width direction, a second internal electrode laminated in a thickness direction, a separator between the first internal electrode and the second internal electrode in the thickness direction, the function unit defining first and second principal surfaces extending along the length direction and the width direction, first and second side surfaces extending along the length direction and the thickness direction, and first and second end surfaces extending along the width direction and the thickness direction;
a portion having a lower mechanical strength than the laminated body in at least one of outermost layers in the thickness direction of the function unit, the portion having the lower mechanical strength comprising a plurality of laminated layers having a hollow portion; and
an exterior body covering the portion having the lower mechanical strength than the laminated body, and covering the first and second principal surfaces and the first and second side surfaces of the function unit;
a first electrode film on the device main body and connected to the first internal electrode; and
a second electrode film on the device main body and connected to the second internal electrode.

2. The power storage device according to claim 1, wherein the plurality of laminated layers delaminate more readily than the laminated body.

3. The power storage device according to claim 1, wherein the portion having the lower mechanical strength than the laminated body is made of a material impregnated with an electrolyte.

4. The power storage device according to claim 1, wherein the portion having the lower mechanical strength than the laminated body is a first portion in a first outermost layer along the first principal surface of the function unit, and the power storage device further comprises a second portion having a lower mechanical strength than the laminated body along the second principal surface of the function unit.

5. The power storage device according to claim 4, wherein the second portion having the lower mechanical strength than the laminated body is a hollow portion.

6. The power storage device according to claim 4, wherein the second portion having the lower mechanical strength than the laminated body comprises a plurality of laminated layers that delaminate more readily than the laminated body.

7. The power storage device according to claim 4, wherein the second portion having the lower mechanical strength than the laminated body is made of a material impregnated with an electrolyte.

8. The power storage device according to claim 1, wherein the first electrode film covers the first end surface of the function unit, and the second electrode film covers the second end surface of the function unit.

* * * * *